United States Patent
Ueffing et al.

(10) Patent No.: US 9,450,367 B2
(45) Date of Patent: Sep. 20, 2016

(54) AMPLIFIER DEVICE AND METHOD FOR AMPLIFYING LASER PULSES

(75) Inventors: Moritz Ueffing, Munich (DE); Thomas Metzger, Munich (DE); Ferenc Krausz, Garching (DE)

(73) Assignees: Max-Planck-Gesellschaft zur Foerderung der Wissenschaften e.V., Munich (DE); Ludwig-Maximilians-Universitaet Muenchen, Munich (DE)

(*) Notice: Subject to any disclaimer, the term of this patent is extended or adjusted under 35 U.S.C. 154(b) by 0 days.

(21) Appl. No.: 14/414,444

(22) PCT Filed: Jul. 13, 2012

(86) PCT No.: PCT/EP2012/002966
§ 371 (c)(1),
(2), (4) Date: May 4, 2015

(87) PCT Pub. No.: WO2014/008909
PCT Pub. Date: Jan. 16, 2014

(65) Prior Publication Data
US 2015/0249315 A1 Sep. 3, 2015

(51) Int. Cl.
*H01S 3/06* (2006.01)
*H01S 3/08* (2006.01)
(Continued)

(52) U.S. Cl.
CPC ........... *H01S 3/08095* (2013.01); *H01S 3/005* (2013.01); *H01S 3/02* (2013.01);
(Continued)

(58) Field of Classification Search
CPC .. H01S 3/08095; H01S 3/081; H01S 3/2308; H01S 3/2325; H01S 3/005; H01S 3/06
See application file for complete search history.

(56) References Cited

U.S. PATENT DOCUMENTS

| 4,468,776 A * | 8/1984 | McLellan | H01S 3/2366 372/103 |
| 4,896,119 A * | 1/1990 | Williamson | H01S 3/235 359/348 |

(Continued)

FOREIGN PATENT DOCUMENTS

DE    102007009635 A1    8/2008
EP         2242151 A1   10/2010

OTHER PUBLICATIONS

Antognini et al., "Thin-Disk Yb:YAG Oscillator-Amplifier Laser, ASE, and Effective Yb:YAG Lifetime", IEEE Journal of Quantum Electronics, vol. 45, No. 8, pp. 993-1005 Aug. 2009.*

(Continued)

*Primary Examiner* — Eric Bolda
(74) *Attorney, Agent, or Firm* — Caesar Rivise, PC

(57) ABSTRACT

A laser pulse amplifier device (100) includes an amplifying cavity (10) comprising an amplifying laser gain medium (11) and multiple cavity mirrors (12.1 to 12.7) spanning a cavity light path (13), wherein the amplifying cavity (10) is configured for an amplification of laser pulses (1) circulating along the cavity light path, and a multi-pass amplifier (20) being optically coupled with the amplifying cavity (10) and comprising multiple deflection mirrors (22) spanning a multipass light path (23), wherein the multi-pass amplifier (20) is configured for a post-amplification of laser pulses (2) coupled out of the amplifying cavity (10), wherein the amplifying cavity (10) and the multi-pass amplifier (20) are arranged such that the laser gain medium (11) of the amplifying cavity (10) is included as an active medium in the multi-pass light path (23) of the multi-pass amplifier (20). Furthermore, a method of amplifying laser pulses is described.

19 Claims, 2 Drawing Sheets

(51) Int. Cl.
H01S 3/02 (2006.01)
H01S 3/23 (2006.01)
H01S 3/07 (2006.01)
H01S 3/105 (2006.01)
H01S 3/13 (2006.01)
H01S 3/00 (2006.01)

(52) U.S. Cl.
CPC ............... *H01S 3/025* (2013.01); *H01S 3/07* (2013.01); *H01S 3/08059* (2013.01); *H01S 3/105* (2013.01); *H01S 3/1305* (2013.01); *H01S 3/235* (2013.01); *H01S 3/0064* (2013.01); *H01S 3/027* (2013.01); *H01S 3/0604* (2013.01); *H01S 3/2316* (2013.01); *H01S 3/2325* (2013.01); *H01S 3/2341* (2013.01)

(56) References Cited

U.S. PATENT DOCUMENTS

| | | | | |
|---|---|---|---|---|
| 5,095,487 | A * | 3/1992 | Meyerhofer | H01S 3/0057 372/102 |
| 7,050,474 | B2 | 5/2006 | Shan et al. | |
| 7,903,715 | B2 | 3/2011 | Nowak et al. | |
| 8,605,355 | B2 * | 12/2013 | Lundquist | H01S 3/2325 359/333 |
| 2005/0053105 | A1 | 3/2005 | Shan et al. | |
| 2009/0316746 | A1 * | 12/2009 | Nowak | G03F 7/70025 372/55 |
| 2011/0051897 | A1 * | 3/2011 | Ahn | H05G 2/003 378/119 |
| 2011/0150013 | A1 | 6/2011 | Spinelli et al. | |
| 2011/0249698 | A1 * | 10/2011 | Hertwig | H01S 3/094084 372/70 |

OTHER PUBLICATIONS

Akahane et al., "High-energy, diode-pumped, picosecond Yb:YAG chirped-pulse regenerative amplifier for pumping optical parametric chirped-pulse amplification", Optics Letters, vol. 32, No. 13, pp. 1899-1901 (2007).
Hong et al., "High-energy, kHz-repetition-rate, ps cryogenic Yb:YAG chirped-pulse amplifier", Optics Letters, vol. 35, No. 11, pp. 1752-1754 (2010).
Metzger et al., "High-repetition-rate picosecond pump laser based on a Yb:YAG disk amplifier for optical parametric amplification", Optics Letters, vol. 34, No. 14, pp. 2123-2125 (2009).
Nickel et al., "Ultrafast thin-disk Yb:KY(WO4)2 regenerative amplifier with a 200-kHz repetition rate", Optics Letters, vol. 29, No. 23, pp. 2764-2766 (2004).
Okishev et al., "Highly stable, all-solid-state Nd:YLF regenerative amplifier", Applied Optics, vol. 43, No. 33, pp. 6180-6186 (2004).
Plaessmann et al., "Multipass diode-pumped solid-state optical amplifier", Optics Letters, vol. 18, No. 17, pp. 1420-1422 (1993).
Venturo et al., "Pulse compression with a high-energy Nd:YAG regenerative amplifier system", Applied Optics, vol. 36, No. 21, pp. 5048-5052 (1997).
Wojtkiewicz et al., "High-energy, high-contrast, double-confocal multipass amplifier", Optics Express, vol. 12. No. 7, pp. 1383-1388 (2004).
English-language abstract for DE 10 2007 009635 (2008).
International Search Report for PCT/EP2012/002966 dated Apr. 5, 2013.

* cited by examiner

AMPLIFIER DEVICE AND METHOD FOR AMPLIFYING LASER PULSES

BACKGROUND OF THE INVENTION

The present invention relates to a laser pulse amplifier device being adapted for providing high average power laser pulses. Furthermore, the invention relates to a method of amplifying laser pulses. Applications of the invention are present in the fields of laser techniques, e.g. for measuring purposes or for creating radiation pulses by high harmonic generation (HHG).

Conventionally, the standard technique for providing high average power laser pulses having a duration in the ps- or sub-ps-range at repetition rates in the kHz regime is based on a combination of a pulse stretcher, a pulse amplifier and a pulse compressor (so-called chirped pulse amplification, CPA). Laser pulses created with a seed laser are stretched with the pulse stretcher, so that the energy density of the pulses is reduced. As an example, the pulse duration is increased from 250 fs to 450 ps. The stretched pulses are subjected to a high power amplification in the pulse amplifier. Because of the increased pulse duration, a distortion of amplifier media in the pulse amplifier due to optically non-linear effects can be avoided. As an example, an amplification by a factor $10^9$ can be obtained using e.g. a Ti:sapphire amplifier. Finally, the amplified pulses are compressed in the pulse compressor, so that the pulse duration is reduced to the initial value of e.g. 250 fs.

Various types of pulse amplifiers have been proposed, like e.g. devices with optical parametric amplification (OPA) or regenerative amplifiers. As an example, T. Metzger et al. ("Optics Letters", Vol. 34, 2009, p. 2123) have proposed a laser setup including a pulse amplifier with a fibre amplifier and a regenerative amplifier. The regenerative amplifier comprises an amplifier cavity with multiple cavity mirrors and a diode pumped disc amplifier. Furthermore, the amplifier cavity includes a Pockels cell arranged for switching selected pulses out of the amplifier cavity for subsequent pulse compression.

Generally, the conventional techniques suffer from severe accumulation of the B-integral (integrated non-linear phase shift) inside the laser gain medium and other optical components of the laser setup. The thin disc technology, as proposed e.g. by T. Metzger et al., reduced the accumulation of non-linear effects in the laser gain medium to a minimum. However, the Pockels cell for switching pulses in and out of the amplifier cavity still represents a limitation with regard to the obtainable amplification factor in the cavity. The crystal of the Pockels cell has a high optical non-linearity resulting in self-focusing and other non-linear effects, which deteriorate the pulse quality and limit the maximum pulse intensities. Thus, the needed optics inside the beam path of the laser setup (e.g. the Pockels cell) necessarily require the pulse stretcher, which typically includes large and complex dispersive delay lines for stretching the pulses to be able to amplify e.g. to the multi-milli-Joule level (see also Y. Akahane in "Optics Letters", Vol. 32, 2007, p. 1899; K.-H. Hong et al. in "Optics Letters", Vol. 35, 2010, p. 1752; and D. Nickel et al. in "Optics Letters, Vol. 29, 2004, p. 2764).

As a further problem, stretching pulses with spectral band-width of about 1 nm to 10 nm is expensive due to the costs of highly dispersive optics. Yet a further disadvantage of the conventional laser setups for providing high average power laser pulses results from the complex structure thereof. Multiple measures are necessary for keeping a sufficient mechanical stability of positioning and adjusting optical components within the laser setup.

The objective of the invention is to provide an improved laser pulse amplifier device and an improved method of amplifying laser pulses, respectively, being capable of avoiding limitations of conventional techniques. In particular, laser pulse amplification is to be provided with improved capability of increasing amplification factors, reduced complexity of the laser setup, improved pulse quality and/or reduced mechanical sensitivity.

These objectives are solved with a laser pulse amplifier device and a method of amplifying laser pulses comprising the features of the invention.

DESCRIPTION OF THE INVENTION

According to a first general aspect of the invention, the above objective is solved by a laser pulse amplifier device, which comprises an amplifying cavity and a multi-pass amplifier, wherein the amplifying cavity includes an amplifying laser gain medium, which simultaneously represents an active medium in the multi-pass amplifier. The amplifying cavity comprises the amplifying laser gain medium and a plurality of cavity mirrors. The cavity mirrors span a cavity light path, which is adapted for a circulation of laser pulses. The cavity mirrors are arranged such that, during each circulation, the laser pulses can interact with the laser gain medium, so that a certain amplification can be obtained. The multi-pass amplifier comprises a plurality of deflection mirrors, which span a multi-pass light path. The multi-pass amplifier is optically coupled with the amplifying cavity such that laser pulses coupled out of the amplifying cavity can be input into the multi-pass amplifier. The laser gain medium of the amplifying cavity is arranged as the active medium in the multi-pass light path of the multi-pass amplifier. The laser gain medium provides a post-amplification of the laser pulses coupled out of the amplifying cavity.

According to a second general aspect of the invention, the above objective is solved by a method of amplifying laser pulses, wherein seed laser pulses are coupled into an amplifying cavity, where they are subjected to an amplification using a pumped amplifying laser gain medium. Subsequently, the amplified laser pulses are coupled out of the amplifying cavity and into a multi-pass amplifier, where a post-amplification of the laser pulses is applied. The amplifying laser gain medium of the amplifying cavity is arranged such that it simultaneously provides the post-amplification in the multi-pass amplifier. According to the invention, both the steps of amplifying the laser pulses, circulating in the cavity light path of the amplifying cavity and post-amplifying the laser pulses traveling along a multi-pass light path of the multi-pass amplifier are conducted commonly using one laser gain medium.

As a main advantage, the invention allows to overcome the above problems of conventional amplifying techniques by a hybrid technology using advantages of an amplifying cavity, preferably including a thin disc oscillator or a thin disc regenerative amplifier, in combination with a multi-pass system. The invention allows an amplification of light pulses within the amplifying cavity, e.g. of the oscillator or regenerative amplifier. Before accumulating non-linear phase distortions, the laser pulses are coupled out into the multi-pass amplifier, that uses the same laser gain medium to amplify the laser pulses to a level not reachable otherwise. The post-amplification of the laser pulses is done after passing any out-coupler of the amplifier cavity, like a Pockels cell, so that eventual optical non-linearities in the out-coupler cannot influence the pulses. As a further important advantage, the inventive laser pulse amplifier device can be operated without a pulse stretcher and/or a pulse compressor. As the influence of optical non-linearities is suppressed, high average power laser pulses can be obtained by the inventive combination of the amplifying cavity and the multi-pass amplifier even without a pulse stretcher and a pulse compressor.

Advantageously, using the same laser gain medium- in the amplifying cavity and in the multi-path amplifier leads to a highly cost efficient and small system. The structure of the laser setup is essentially simplified compared with conventional techniques, thus increasing the mechanical stability of the device.

The cavity light path of the amplifying cavity includes multiple plane and/or curved mirrors, which are arranged such that a laser pulse circulating in the amplifying cavity follows the same cavity light path multiple times. The laser pulse is imaged to itself. Advantageously, an improvement of the beam profile in the amplifying cavity is obtained. A deterioration of the beam profile is avoided as the amplified laser pulse is coupled out of the amplifying cavity before non-linear properties of optical components, in particular of the Pockels cell, have a negative effect.

Depending on the geometry of the amplifying cavity, the amplifying laser gain medium can be used in reflection or transmission. The laser gain medium is an optical component being made of a material, which is capable of amplifying laser pulses. The laser gain medium preferably is an integral material, which is exposed for optical pumping, using e.g. laser diodes. The laser gain medium may comprise a homogeneous material having uniform optical properties or an inhomogeneous material having sections with different optical properties, e.g. due to doping, which are used for the amplification and the amplifying cavity or the post-amplification in the multi-pass amplifier, respectively.

According to a preferred embodiment of the invention, the laser pulse amplifier device comprises an optical coupler device, which is configured for in-coupling the seed laser pulses into the amplifying cavity and for out-coupling (switching) amplified laser pulses into the multi-pass light path of the multi-pass amplifier. According to this preferred embodiment, the in-coupling and out-coupling steps are conducted by a single optical coupler device. The optical coupler device preferably comprises a Pockels cell. As an advantage, by using one Pockels cell for both coupling functions, the quantity of optical non-linearity in the laser setup and the complexity thereof are reduced.

Preferably, a control device is provided, which is arranged for actuating the optical coupler device. As an example, the control device is configured for supplying an electrical switching signal to the crystal of a Pockels cell at an appropriate timing. The optical coupler device is actuated with the control device. Additionally or alternatively, the control device is adapted for stabilizing the output pulse energy against thermal effects of optical components in the laser system by actuating movable mechanical components of mirror mounts. According to a particularly preferred embodiment of the invention, the control device is connected with a pulse monitoring device, which is arranged for sensing at least one of the pulse intensity and the pulse beam profile in the amplifying cavity. According to a particularly advantageous implementation of the invention, a control loop is provided including the pulse monitoring device and the control device. The control loop is adjusted such that the optical coupler device is activated when the laser pulses circulating in the amplifying cavity have predetermined pulse parameters, in particular if the laser pulses have exceeded a predetermined threshold intensity and/or have a starting deterioration of the beam profile. With the control loop, the laser pulses can be out-coupled from the amplifying cavity as long as a distortions by the optical components of the amplifying cavity can be avoided.

As mentioned above, the laser gain medium may comprise any material being capable of stimulated light amplification, which is coupled with a pump source. According to a preferred feature of the invention, the laser gain medium comprises a disc laser material (also called: thin disc laser material). Disc laser materials, based on e.g. Yb:YAG, have particular advantages in terms of minimizing the introduction of optical non-linearities into the light path as well as an efficient cooling of the laser gain medium. The disc laser material typically is combined with a back-mirror reflecting the amplified light field along the cavity light path. According to a second variant, the laser gain medium may comprise a bulk laser material, as it is known from conventional laser amplifiers and which is made of e.g. Nd:YAG, Nd:YLF or Yb:YAG (see Vincent A. Venturo et al. in "Applied Optics" Vol. 36, No. 21, 5048 (1997); Andrey V. Okishev et al. in "Applied Optics" Vol. 43, No. 33 6180 (2004); Y. Akahane et al. in "Optics Letters Vol. 32 No. 13 1899 (2007)). The bulk laser material can be used in transmission or—if combined with a mirror—in reflection.

According to a further preferred embodiment of the invention, the laser pulse amplifier device comprises a carrier device being configured for supporting optical components of the laser pulse amplifier device. The carrier device preferably has a curved platform with an inner carrier surface. The carrier device comprises e.g. a hollow cylinder, preferably made of metal, ceramic or plastic, or a section thereof, like e.g. a half cylinder. With this embodiment, the amplifying cavity and the multi-pass amplifier preferably are arranged on the inner carrier surface of the carrier device. Advantageously, the curved platform of the carrier device provides an arrangement of the cavity mirrors and/or the deflection mirrors in three dimensions. The carrier device, like e.g. a cylindrical tube accommodating laser oscillators and/or amplifying systems ensures a mechanically stable housing.

Thus, to increase the stability of the overall amplifier, a cylindrical geometry can be chosen to mount the amplifier head (including the laser gain medium) and the optics of both amplifier units, namely the amplifying cavity and the multi-pass amplifier. Using this geometry, the multi-pass amplifier can be realized using a 4f imaging of the beam with a parabolic mirror.

Preferably, the carrier device may have a closed structure, so that it is possible to evacuate the carrier device to a pressure below atmospheric pressure (vacuum). As a further advantage, the curved carrier platform allows the use of less massive walls compared with conventional breadboards or housings with rectangular or cubic symmetry. Mounting all optical components directly into the carrier device, in particular directly into the tube, further decreases the size of the system as mirrors can be easily placed in all three dimensions.

According to a further preferred embodiment of the invention, the surrounding of the amplifying cavity and the multi-pass amplifier is evacuated. An evacuable space is formed around both of the amplifying cavity and the multi-pass amplifier, e.g. by a closed housing. The inner space of the closed housing is connected with a vacuum pump. With a preferred example, the housing is the above carrier device, like e.g. a hollow cylinder with closed surfaces having a connector for the vacuum pump and possibly transparent windows for in- or out-coupling of laser pulses or monitoring signals. For reducing eventual mechanical vibrations created by the vacuum pump, a damping device can be provided. The damping device is adapted for a mechanical decoupling of the vacuum pump from the housing, in particular from the amplifying cavity and the multi-pass amplifier.

With a preferred practical implementation, e.g. 50 to 100 circulations are provided in the amplifying cavity for amplifying a circulating laser pulse. Subsequently, the optical coupler device is switched for out-coupling the laser pulse into the multi-pass amplifier. With preferred embodiments of the invention, the multi-pass amplifier is configured for at least 2, particularly preferred at least 20 interactions of the laser pulse with the laser gain medium.

BRIEF DESCRIPTION OF THE DRAWINGS

Further details and advantages of the invention are described in the following with reference to the attached drawings, which show in.

Preferred embodiments of the invention are described in the following with particular reference to the combination of an amplifying cavity and a multi-pass amplifier being arranged with a common laser gain medium. Details of designing the amplifying cavity and the multi-pass amplifier are not described as far as they are known as such from conventional techniques. In particular, the amplifying cavity as such basically can be configured along the design described in the above publication of T. Metzger et al. Furthermore, the multi-pass amplifier can be configured as described e.g. in H. Plaessmann et al. "Opt. Lett." vol. 18, 1993, p. 1420; or J. Wojtkiewicz et al. "Opt. Express" vol. 12, 2004, p. 1383.

Furthermore, it is emphasized that exemplary reference is made to an amplifying cavity comprising 5 or 6 cavity mirrors and to a multi-pass amplifier comprising 3 or 5 deflection mirrors, respectively. The implementation of the invention is not restricted to these numbers, but rather correspondingly possible with smaller or larger numbers of reflective mirrors. The schematic illustrations show plane mirrors or reflective surfaces. In practice, at least one of the mirrors or reflective surfaces can have a curved, concave and/or convex shape.

Figure 1:
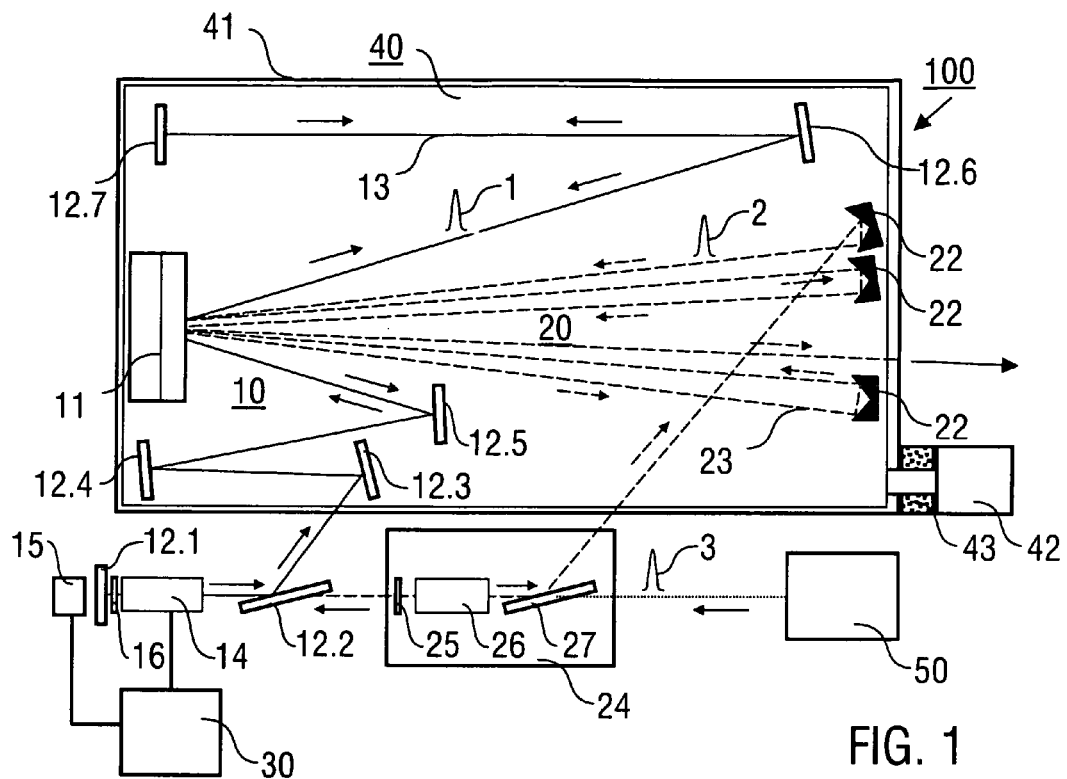
FIG. 1: a schematic illustration of a first embodiment of the laser pulse amplifier device according to the invention.

FIG. 1 illustrates a first embodiment of an inventive laser pulse amplifier device 100, which comprises an amplifying cavity 10, a multi-pass amplifier 20, a carrier device 40 and a seed laser 50. Preferably, the seed laser 50 is provided with a pulse picker unit (not shown) selecting pulses to be amplified from the pulse sequence output by the seed laser 50. The pulse picker unit comprises e. g. a Pockels cell and a Faraday isolator.

The amplifying cavity 10 and the multi-pass amplifier 20 are arranged on the carrier device 40 within a closed, evacuable housing 41. The seed laser 50, further optical components for in- and/or out-coupling of laser pulses and the control device 30 are arranged outside the housing 41. According to a modified implementation of the invention, at least some of these components can be arranged in the housing 41 as well.

The amplifying cavity 10 comprises an amplifying laser gain medium 11 and a plurality of cavity mirrors 12.1 to 12.7, which are arranged inside or outside of the housing 41, respectively. The laser gain medium 11 is a thin disc laser as described e.g. in the above publication of T. Metzger et al. The laser gain medium 11 is pumped with a pump source (not shown) as it is known from conventional disc laser amplifiers. Furthermore, a cooling device (not shown) can be provided for cooling the laser gain medium 11. The cavity mirrors 12.1 to 12.7 are designed in dependency on their function along the cavity light path 13 (shown with a drawn line). For example, an end mirror 12.1 outside the housing 41 is a plane reflective mirror, which passes a small portion, e.g. below 0.05%, of the light field as a monitoring signal to a pulse monitoring device 15. The second cavity mirror 12.2 has a polarization dependent reflectivity so that it functions as a reflector along the cavity light path 13 or an out-coupler for out-coupling a laser pulse into the multi-pass amplifier. The remaining cavity mirrors 12.3 to 12.7 are plane or curved mirrors having high reflectivity (above 99.95%), made of dielectric layers as it is known from conventional amplifying cavities. The length of a complete circulation along the cavity light path 13 from the first end mirror 12.1 via the cavity mirrors 12.2 to 12.6 to the second end mirror 12.7 and back to the first end mirror 12.1 is e.g. 4 m to 10 m.

The amplifying cavity 10 furthermore includes an optical coupler device 14, which comprises a Pockels cell. With the optical coupler device 14, the polarization of the light field along the cavity light path 13 can be rotated in dependency on an activation signal from the control device 30. Additionally, a polarizing λ/4 wave plate 16 is arranged between the optical coupler device 14 and the end mirror 12.1.

The multi-pass amplifier 20 comprises a plurality of deflection mirrors, which together with the laser gain medium 11 of the amplifying cavity 10 span a multi-pass light path 23 (shown with dashed line). Each deflection mirror 22 comprises two reflective surfaces, so that each deflection mirror provides a back-reflection towards the laser gain medium 11. Furthermore, an optical isolator 24 is provided, which includes a λ/2 wave plate 25, a polarization rotator 26 and a polarizing reflector 27. With the optical isolator 24, any feedback from the regenerative amplifier 10 to seed laser 50 is suppressed. The optical isolator separates ingoing and outgoing beams after the amplification in the regenerative amplifier.

The control device 30 comprises e.g. a micro-controller, which is connected with the pulse monitoring device 15 and the optical coupler device 14. The control device 30 is structured and operated as it is known from conventional techniques for switching amplified laser pulses out of a regenerative amplifier cavity.

Figure 3:
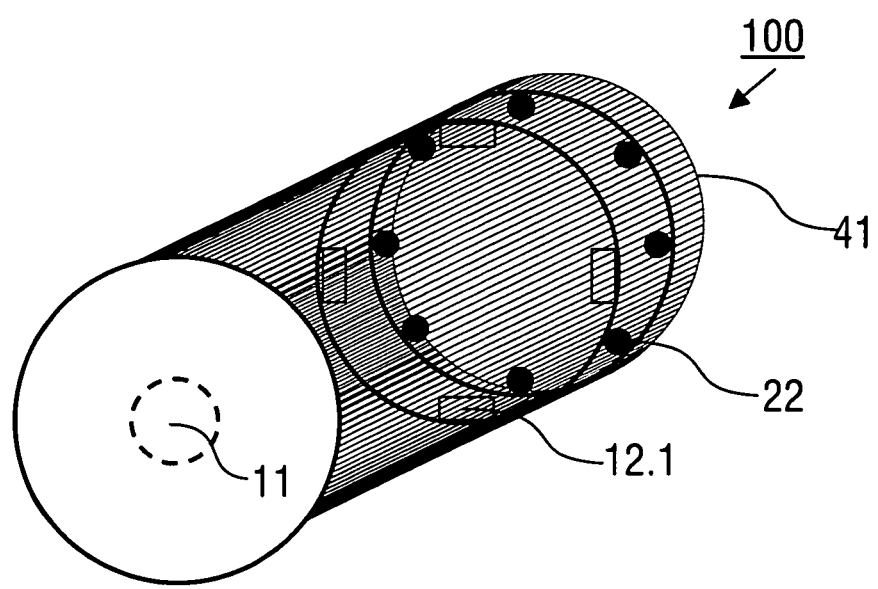
FIG. 3: a schematic perspective view on a third embodiment of the laser pulse amplifier device having a tube geometry.

The carrier device 40 is a solid plane or curved platform, like a bread board or a hollow cylinder (see FIG. 3). During the operation of the laser pulse amplifier device 100, a vacuum pump 42 can be operated for an evacuation of the inner space of the housing 41. For avoiding the transfer of mechanical oscillations from the vacuum pump 42 to the housing 41, a damping device is provided, which comprises e.g. a vibration damping foam or a vibration support of the vacuum pump 42.

The inventive method of amplifying laser pulses is conducted using the following steps. Firstly, the seed laser 50, which is e.g. a Ti:sapphire oscillator with a center wave-length in the range of 600 nm to 1060 nm and a pulse duration of 7 fs, is operated for creating seed pulses 3. The seed pulses 3 are coupled through the optical isolator 24 and the polarizing mirror 12.2 into the amplifying cavity 10. After in-coupling a single laser pulse, the optical coupler device 14 is adjusted such that the laser pulse 1, after being reflected at the end mirror 12.1, is reflected by the polarizing mirror 12.2 along the cavity light path 13 of the amplifying cavity 10. During each circulation, an interaction with the laser gain medium 11 is provided resulting in an amplification of the laser pulse 1 by a factor of 1.1. Accordingly, after e.g. 50 to 100 circulations, an amplification of $10^4$-$10^8$ is obtained. During the circulation, the intensity of the circulating pulse 1 is measured with the pulse monitoring device 15. If the intensity exceeds a threshold value stored in the control device 30, the optical coupler device 14 is switched such that the laser pulse is out-coupled towards the optical isolator 24 and with the polarizing mirror 27 thereof into the multi-pass amplifier 20. Subsequently, a post-amplification is provided. The laser pulse 2 is traveling along the multi-pass light path 23 including multiple interactions with the laser gain medium 11. Finally, the post-amplified laser pulse 2 is output with an energy of e. g. 25 mJ.

When the amplified laser pulse 1 is out-coupled from the amplifying cavity 10 to the multi-path amplifier 20, the next laser pulse to be amplified can be coupled into the amplifying cavity 10. With a repetition frequency of the seed laser 50 of e.g. 100 MHz, an output frequency of the post-amplified laser pulses of e.g. 5 kHz can be obtained using a pulse picker (not shown). Alternatively, the next laser pulse to be amplified can be coupled into the amplifying cavity 10 when the amplified laser pulse 1 is out-coupled from the multi-path amplifier 20.

Multiple modifications of the embodiment of FIG. 1 are possible within the scope of the claimed invention. As an example, the separate deflection mirrors 22 of the multi-pass amplifier 20 can be replaced by a parabolic reflector device (not shown). The parabolic reflector device has a parabolic reflective surface wherein the laser gain medium 11 is positioned in a focus of the reflective surface. With further modifications, monitoring and beam analyzing devices can be provided in each of the amplifying cavity 10 and the multi-pass amplifier 20 (not shown).

Figure 2:
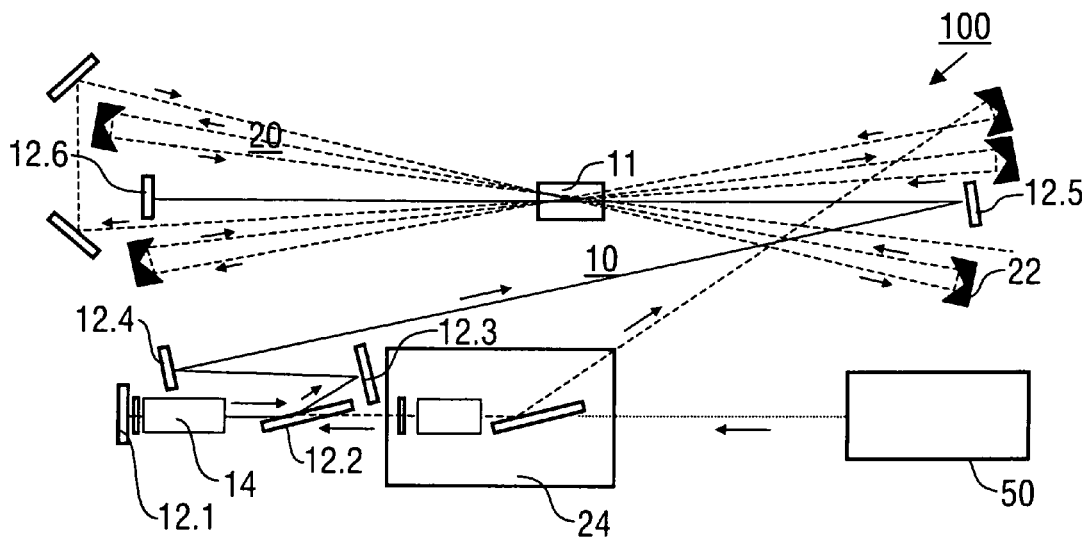
FIG. 2: a schematic illustration of main components of a second embodiment of the laser pulse amplifier device according to the invention.

A further alternative embodiment of the inventive laser pulse amplifier device 100 is schematically illustrated in FIG. 2. With this illustration, the main components of the amplifying cavity 10, the multi-pass amplifier 20 and the seed laser 50 are shown only. Optionally, further components, like the control device with the pulse monitoring device and/or the carrier device and/or the vacuum pump can be implemented as shown in FIG. 1.

As with the embodiment of FIG. 1, the amplifying cavity 10 comprises a laser gain medium 11 and a plurality of cavity mirrors 12.1 to 12.6. In-coupling of a seed pulse from the seed laser 50 into the amplifying cavity 10 is obtained with the optical coupler device 14, e.g. a Pockels cell. After a sufficient amplification of the laser pulse in the amplifying cavity 10, the optical coupler device 14 is operated for out-coupling the laser pulse towards the optical isolator 24 and into the multi-pass amplifier 20. After a reflection at multiple deflection mirrors and transmissions through the laser gain medium 11, the post-amplified laser pulse is output from the laser pulse amplifying device 100.

Yet another modified embodiment of the laser pulse amplifying device 100 is schematically illustrated in FIG. 3. With this embodiment, the cavity mirrors 12.1 and the deflection mirrors 22 as well as the laser gain medium 11 of the amplifying cavity and the multi-pass amplifier, respectively, are supported on an inner surface of a hollow cylinder 41. The embodiment of FIG. 3 has particular advantages in terms of mechanical stability of both of the amplifying cavity and the multi-pass amplifier and compact housing structure.

The features of the invention disclosed in the above description, the drawings and the claims can be of significance both individually as well as in combination for the realization of the invention in its various embodiments.

The invention claimed is:

1. Laser pulse amplifier device, including
an amplifying cavity comprising an amplifying laser gain medium and multiple cavity mirrors spanning a cavity light path, wherein the amplifying cavity is configured for an amplification of laser pulses circulating along the cavity light path in a laser gain medium section of the laser gain medium, and
a multi-pass amplifier being optically coupled with the amplifying cavity and comprising multiple deflection mirrors spanning a multi-pass light path, wherein the multi-pass amplifier is configured for a post-amplification of laser pulses coupled out of the amplifying cavity, wherein
the amplifying cavity and the multi-pass amplifier are arranged such that the same laser gain medium section of the laser gain medium of the amplifying cavity is included as an active medium in the multi-pass light path of the multi-pass amplifier wherein the laser gain medium comprises a thin disk laser material combined with a back-mirror reflecting the amplified light field along the cavity light path and the multi-pass light path.

2. Laser pulse amplifier device according to claim 1, further comprising
an optical coupler device being arranged for both of in-coupling seed laser pulses to be amplified into the amplifying cavity and out-coupling amplified laser pulses to be post-amplified into the multi-pass amplifier.

3. Laser pulse amplifier device according to claim 2, further comprising
a control device being adapted for actuating the optical coupler device or for stabilizing output pulse energy against thermal effects of optical components in the laser pulse amplifier device by actuating mechanical components of mirror mounts.

4. Laser pulse amplifier device according to claim 3, wherein
the amplifying cavity is provided with a pulse monitoring device, and
the control device and the pulse monitoring device provide a control loop for actuating the optical coupler device.

5. Laser pulse amplifier device according to claim 1, further comprising
a carrier device comprising a curved platform having an inner carrier surface, wherein
the amplifying cavity and the multi-pass amplifier are arranged on the inner carrier surface.

6. Laser pulse amplifier device according to claim 5, wherein
the carrier device comprises a hollow cylinder, wherein the inner surface of the hollow cylinder provides the inner carrier surface.

7. Laser pulse amplifier device according to claim 5, wherein the multi-pass amplifier includes a parabolic reflector device and multiple beam displacement elements, and the parabolic reflector device provides the multiple deflection mirrors of the multi-pass amplifier.

8. Laser pulse amplifier device according to claim 1, wherein the amplifying cavity and the multi-pass amplifier are arranged in an evacuable space connected with a vacuum pump.

9. Laser pulse amplifier device according to claim 8, further comprising a damping device configured for mechanically decoupling the vacuum pump from the amplifying cavity and the multi-pass amplifier.

10. Laser pulse amplifier device according to claim 1, wherein the multi-pass amplifier includes at least two deflection mirrors.

11. Laser pulse amplifier device according to claim 1, further comprising a seed laser being optically coupled with the amplifying cavity.

12. Method of amplifying laser pulses, including the steps of in-coupling seed laser pulses into an amplifying cavity comprising an amplifying laser gain medium and multiple cavity mirrors spanning a cavity light path, amplifying laser pulses circulating along the cavity light path in the amplifying cavity in a laser gain medium section of the laser gain medium, out-coupling laser pulses from the amplifying cavity into a multi-pass amplifier comprising multiple deflection mirrors spanning a multi-pass light path, and post-amplifying the laser pulses traveling in the multi-pass amplifier, wherein both of the steps of amplifying the laser pulses circulating along the cavity light path and post-amplifying the laser pulses traveling along the multi-pass light path are conducted using the same laser gain medium section of the laser gain medium of the amplifying cavity wherein the laser gain medium comprises a thin disk laser material combined with a back-mirror reflecting the amplified light field along the cavity light path and the multi-pass light path.

13. Method according to claim 12, wherein the in-coupling and out-coupling steps are conducted using one common optical coupler device.

14. Method according to claim 13, further comprising actuating the optical coupler device with a control device, wherein the optical coupler device is controlled with a control loop including a pulse monitoring device.

15. Method according to claim 12, wherein the amplifying cavity and the multi-pass amplifier are arranged on an inner carrier surface of a curved platform of a carrier device.

16. Method according to claim 12, wherein the multi-pass amplifier includes a parabolic reflector device and multiple beam displacement elements, and the laser pulses traveling along the multi-pass light path of the multi-pass amplifier are deflected by the parabolic reflector device and the beam displacement elements.

17. Method according to claim 12, including evacuating a space surrounding the amplifying cavity and the multi-pass amplifier using a vacuum pump.

18. Method according to claim 17, further comprising mechanically decoupling the vacuum pump from the amplifying cavity and the multi-pass amplifier.

19. Method according to claim 12, including at least one of the features the laser pulses pass at least 30 or at most 200 circulations along the cavity light path of the amplifying cavity, and the amplified laser pulses pass at least two times the laser gain medium during traveling along the multi-pass light path of the multi-pass amplifier.

* * * * *